Sept. 4, 1956     M. A. RUDNER     2,761,710

SHAFT SEALS

Filed Aug. 10, 1953

INVENTOR.
Merritt A. Rudner
BY
ATTORNEY

United States Patent Office 2,761,710
Patented Sept. 4, 1956

2,761,710

SHAFT SEALS

Merritt A. Rudner, Haddonfield, N. J., assignor to United States Gasket Company, Camden, N. J., a corporation of New Jersey Application August 10, 1953, Serial No. 373,410

3 Claims. (Cl. 286—11)

This invention relates to shaft seals, and particularly to an oil seal to prevent oil seepage along an operating shaft extending into a closed container having oil therein.

One object of this invention is to provide an oil seal for an operating shaft extending through the wall of a vessel containing an oil-immersed capacitor that is to be adjustably operated from outside the vessel by means of the projecting shaft.

In certain adjustable capacitors, the capacitor elements are immersed in oil to maintain a constant characteristic of operation, independent of variation in external ambient pressures. An internal pressure of about eight or ten pounds above atmospheric pressure may be provided to help maintain the constancy of internal operating conditions within the vessel.

One of the problems encountered has been that the oil would seep along the shaft, due to capillary action, and would come out through the shaft-bearing seal to cover the outside of the shaft. As a result, not only was the quantity of oil in the vessel diminished, but the outside of the case or vessel became covered with the oil and attracted and collected dust and dirt.

Previous practice has relied upon the use of a smoothly ground shaft extending through an undersize opening in a disc or plate of resilient semi-hard rubber or similar material, with the expectation that the pressure of the rubber against the smooth surface of the shaft would prevent oil from seeping through between the shaft surface and the tightly pressed side wall of the opening in the rubber disc, due to capillary action, with or without internal pressure to aid such action.

Such construction has proved ineffective, however, because the capillary action of the oil along the surface of the shaft was sufficient to overcome the normal pressure of the rubber disc against the shaft surface.

In the present construction, in accordance with the principle of this invention, advantage is taken of one of the desirable characteristics of one of the fluorocarbon resins, namely the non-wetting characteristic of the polytetrafluoroethylene resin, presently well known by its commercial trade name "Teflon."

Due to the non-wetting characteristic of the surface of the Teflon material, there is no capillary action possible between oil and the surface of this material, as distinguished from the manner in which such capillary action occurs between oil and a metallic shaft. Therefore, it is sufficient to cover a predetermined operating portion or length of the shank of the shaft, where the sealing action is desired, with a cylindrical body of Teflon so the surface of the Teflon is engaged by the rubber disc, to keep the case closed. The sealing action is then complete and adequate, since none of the oil will travel up onto the Teflon surface from the shank of the shaft inside the case. The Teflon serves as an oil barrier against oil seepage.

This invention lends itself to a very simple form of construction, as illustrated in the accompanying drawings, in which.

Figure 1:
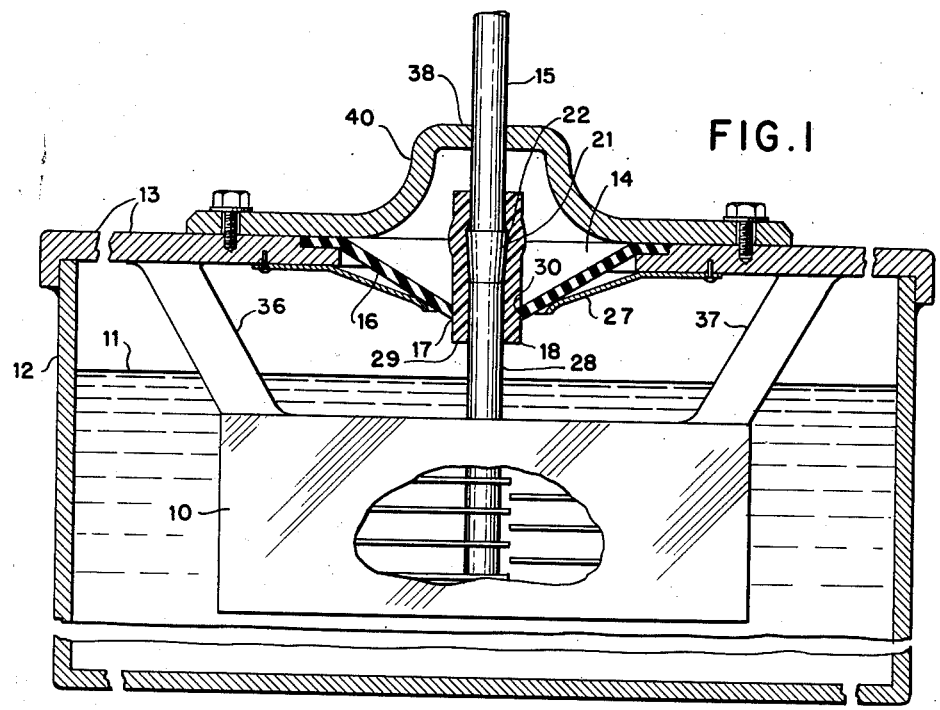
Figure 1 is a side view of a case or vessel with its side wall broken away, to expose an oil-immersed variable condenser with its operating shaft extending up through the cover of the case.

As shown in the drawings, an electronic component, which for the present description is a variable condenser 10, is immersed in a body of oil 11 in a container or case 12, which may take any suitable form as a closed vessel to contain and enclose the capacitor 10. The case 12 is shown provided with a cover or top wall 13 provided with an opening 14 through which an operating shaft 15 extends from outside into the inside of the case 12 to operate the variable condenser 10. The opening 14 in the top cover of the case 12 is encircled by an annular disc 16 of resilient rubber or rubber-like material with a certain degree of hardness and self-sustaining ability, as, for example with a durometer number of 40–50. The disc 16 is provided with a central axial opening 17 to accommodate the shaft 15 modified by an encircling cylindrical sealing sleeve 18 with which the rubber disc 16 is intended to establish and maintain a seal during operating and static conditions.

The shaft 15 is modified in accordance with this invention by the application of the cylindrical sleeve 18 of the Teflon material. The sleeve 18 has an internal diameter slightly less than the diameter of the shank of the shaft 15.

The sleeve 18 is press-fitted onto the shaft 15. The shank of the shaft 15, in the region of the seal is provided with a conical barb 21 which may be preferably integrally formed on the shaft, or otherwise secured thereto. The cylindrical sleeve 18 of Teflon is applied by being force-fitted over the shaft and over the barb 21 before the shaft is assembled with the condenser. The sleeve 18 is thus securely held in position against relative movement on the shaft 15, both by friction pressure and by the barb 21. Moreover, the barb provides greater pressure against the inside wall of the sleeve for a tighter seal.

In force-fitting the Teflon sleeve over the shaft 15 and relying upon the barb 21 to hold the sleeve fixed on the shaft 15, another desirable characteristic of Teflon is utilized for this particular application. Teflon has a characteristic that is sometimes referred to as "elastic memory." It may be compressed for a short time, and when the pressure is released the Teflon will gradually resume its original dimension.

In this application, when the Teflon sleeve is pressed over the shaft and the conical barb 21, the forward portion of the sleeve that passes over the barb 21 is distended internally to the maximum dimension of the barb. After the sleeve is moved to its ultimate position on the shaft and left there, the distended portion of the sleeve gradually tends to resume its smaller diameter. The portion of the sleeve that has passed over the base periphery 21–a of the barb will gradually move radially inward to encircle the shank of the shaft and establish a tight seal therewith.

The original axial passage in the Teflon sleeve 18 is made slightly less in diameter than the diameter of the shaft 15, so that a press-fit is necessary to apply the sleeve. The barb 21 is shown employed in its frusto-conical shape, co-axial on the shaft. The shaft is about 0.003 inch more in diameter than the internal diameter of the sleeve. The maximum diameter of the barb, at its base, is about 0.030 inch more than the internal diameter of the sleeve 18.

The sleeve 18 is of sufficient length to extend below the region of contact with the rubber-like sealing disc 16. Any oil that tends to move by capillary action upward along the bottom shank section 28 of the shaft, below the Teflon sleeve 18, stops at the bottom edge surface 29 of the sleeve due to the non-wetting characteristic of the Teflon sleeve. The oil cannot move by capillary action onto the non-wettable Teflon. The Teflon sleeve thus serves as a simple barrier to prevent advance of the oil up to the sealing region 30 where the Teflon sleeve 18 is engaged by the rubber disc 16. Consequently, movement of the oil to the outside of the case 12 is prevented.

In order to assure continuous contact between the Teflon sleeve and the deformed border portion of the rubbery disc 16, adjacent its central co-axial opening, one or more springs or spring washers 27 may be used to press against the appropriate side of the border.

Figure 4:
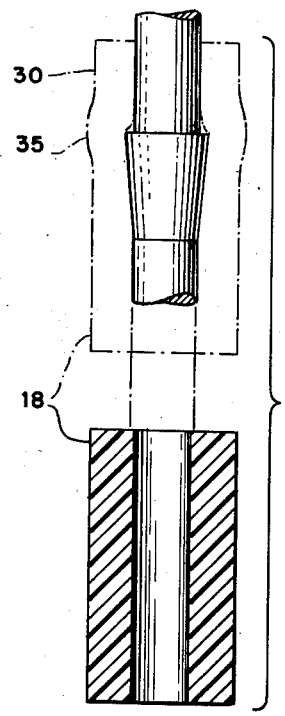
Figure 4 is an exploded view showing how the sealing sleeve is to be applied to the shaft.
Figure 3:
Figure 3 is a top sectional view of the shaft, above the barb.
Figure 2:
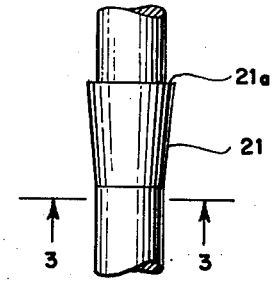
Figure 2 is a side view of a portion of the operating shaft, provided with a retaining barb to aid in holding the sealing sleeve against rotation or displacement on the shaft.

The larger diameter of the base of the conical barb 21 causes the outer surface of the sleeve 18 to be bulged outwardly, over a distance bridging the length of the barb, as shown in Fig. 4 to form an annular bump 35.

The sealing region of contact of the disc 16 on the outer surface of the sleeve 18 should be located on a level peripheral surface of the sleeve, on either side of bump 35, to provide an even track for some efficient sealing action between the sleeve and the disc 16.

Where the pressure in the case 12 is greater than ambient air pressure, the sealing region on the sleeve should preferably be below the bump 35. The sealing action of the disc against the Teflon sleeve would be augmented by reason of the bump as a vertical circular stop for the disc. For sub-normal pressure in the case, the rubbery sealing disc could be inverted and disposed to ride the sleeve 18 above the annular bump 35.

The disc 16 may be rubber or a rubber-like material, such as silicone rubber or neoprene. Its outer rim is appropriately secured to the cover 13 of the case 12 with a hermetic seal. The cover 13 is then capped on the body of the case to ensure a hermetic seal against oil seepage.

The component 10, shown here as a condenser, is appropriately supported either on the floor of the case, or from the cover of the case. For illustrative purpose, the condenser is shown supported from the cover by suitable brackets 36 and 37. An outboard bearing 38, for the operating shaft 15, is supported by an end-bell spider 40 secured to the top of the cover 13.

By the provision of the sleeve 18 of non-wetting material on the shaft, to extend below the sealing region engaged by the sealing rubber disc 16, a positive barrier is established by the sleeve to prevent oil movement up to the sealing region on the sleeve.

The action of the rubber disc on the sleeve 18 of polytetrafluoroethylene is sufficient to establish a tight sealing action, due to the frictionless nature of the surface of the polytetrafluoroethylene and the resilient adaptability of the rubber disc, so long as the oil is kept out of the sealing region, where it would otherwise form a lubricating film.

The barb on the inside of the sleeve serves to hold the sleeve on the shaft and to provide added pressure and tightness toward a hermetic sealing action at the small excess pressure that may be employed in the case. The barb may be formed to point in either direction, but it is preferably pointed in the direction shown, so the self-restoring portion of the sleeve, distended by the barb, will be on top of the sealing region.

By preventing oil emission from the case, the outside of the case is kept clean, but more important, in the application here illustrated, the condenser plates are kept covered by the oil. So long as those plates are kept covered and immersed in the oil, the efficiency of the condenser remains unaffected.

Thus by the addition of a simple sleeve of the fluoro-carbon resin on the shaft, a barrier is established to prevent oil movement onto the shaft. The oil is thus kept out of the sealing region between the shaft and the sealing rubber disc engaging the sleeve on the shaft, and sealing action between the rubber disc and the resin is otherwise assured by the frictionless resiliency of the fluoro-carbon resin and the resilient adaptability of the rubbery disc.

What is claimed is:

1. A shaft seal for a shaft extending through an opening in a wall of a vessel containing a mechanism operable by the shaft and immersed in oil in the vessel, said seal comprising a shank of the shaft; an annular disc of rubber-like material having an outer rim of its body secured to said wall and having a central opening aligned with the opening in said wall and of such diameter as to frictionally engage said shank of the shaft; said shank of the shaft having a barb formed thereon in the region adjacent said annular disc; and a hollow cylindrical body of polytetrafluoroethylene resin fitted co-axially onto and surrounding said shank of the shaft and said barb to present a cylindrical outer surface of engagement to the material at the rim of the opening in said disc, said cylindrical body fitting tightly on said shank and being additionally secured thereto against turning thereon by said barb, said cylindrical body extending along said shank in the direction of the oil to serve as a barrier to prevent oil seepage to the region of engagement between said disc and said cylindrical body.

2. In a hermetic sealing arrangement for an adjustable mechanism immersed in oil within a container, the air pressure within the container being other than atmospheric pressure, a sealing structure for preventing oil creepage out of the container along an upwardly extending shaft member connected to the oil-immersed mechanism and for maintaining the hermetic seal of the container, said structure comprising a shank of the shaft, a layer of polytetrafluoroethylene secured to said shank of the shaft for rotation therewith, a stationary member of rubber-like material having an aperture therein and frictionally fitted about and in contact with said layer to form an air-tight seal, said layer having an enlarged annular portion disposed on a low pressure side of said member for providing a circular stop to limit movement of said member along said layer, said layer having a portion extending along the shaft in direction of the oil-immersed mechanism to provide a barrier against creepage of oil to the area of contact between said member and said layer to maintain the air-tight integrity of said seal.

3. A shaft seal comprising a shaft having a predetermined portion adapted to pass through a sealing region, a resilient ring member surrounding a shank portion of said shaft at said sealing region, a cylinder of polytetrafluoroethylene encircling said shaft with a tight sealing engagement at said sealing region, said cylinder presenting a cylindrical peripheral surface of contact to said resilient ring element and having a portion extending along the shaft and beyond the region of sealing engagement, and a barb on said shank of said shaft to serve as a key to aid in holding said cylinder of polytetrafluoroethylene against slipping rotation on said shaft.

References Cited in the file of this patent

UNITED STATES PATENTS

| | | |
|---|---|---|
| 1,958,120 | Tuxbury et al. | May 8, 1934 |
| 2,291,248 | Myers | July 28, 1942 |
| 2,314,021 | Sladky | Mar. 16, 1943 |
| 2,327,891 | Herman | Aug. 24, 1943 |
| 2,615,763 | Wolford | Oct. 28, 1952 |
| 2,649,316 | Beezley | Aug. 18, 1953 |
| 2,657,943 | Booser et al. | Nov. 3, 1953 |

FOREIGN PATENTS

| | | |
|---|---|---|
| 667,393 | Great Britain | Apr. 25, 1950 |